(12) United States Patent
Tong

(10) Patent No.: US 11,282,166 B2
(45) Date of Patent: Mar. 22, 2022

(54) METHOD FOR DISPLAYING ELECTRONIC MAP, ELECTRONIC DEVICE AND READABLE STORAGE MEDIUM

(71) Applicant: BEIJING BAIDU NETCOM SCIENCE TECHNOLOGY CO., LTD., Beijing (CN)

(72) Inventor: Juntao Tong, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/207,525

(22) Filed: Mar. 19, 2021

(65) Prior Publication Data

US 2021/0209727 A1 Jul. 8, 2021

(30) Foreign Application Priority Data

Sep. 7, 2020 (CN) .......................... 202010930376.8

(51) Int. Cl.
G06T 3/40 (2006.01)
G06T 7/194 (2017.01)
G06T 11/60 (2006.01)

(52) U.S. Cl.
CPC ............. *G06T 3/40* (2013.01); *G06T 7/194* (2017.01); *G06T 11/60* (2013.01)

(58) Field of Classification Search
CPC ............ G06T 3/40; G06T 7/194; G06T 11/60
See application file for complete search history.

(56) References Cited

U.S. PATENT DOCUMENTS

| 6,636,802 B1* | 10/2003 | Nakano | G01C 21/32 |
| | | | 701/532 |
| 2004/0090349 A1* | 5/2004 | Iwata | G09B 29/106 |
| | | | 340/995.1 |

(Continued)

FOREIGN PATENT DOCUMENTS

JP 2012174067 A 9/2012

OTHER PUBLICATIONS

Van Oosterom, Peter. The GAP-tree, an approach to 'on-the-fly' map generalization of an area partitioning. Paper for GISDATA Specialist Meeting on Generalization, Compiegne, Franvr, Dec. 15-19, 1993 (Year: 1993).*

(Continued)

*Primary Examiner* — Yu Chen
(74) *Attorney, Agent, or Firm* — J.C. Patents

(57) ABSTRACT

The present application discloses a method for displaying an electronic map, an electronic device and a readable storage medium, and relates to the technical field of electronic maps, intelligent transportation, automatic driving, artificial intelligence technologies, etc. The specific implementation scheme is: after receiving a downsizing instruction from an electronic device, a server generates second map data under a second scale according to first map data under a first scale, and obtains third map data by repairing the second map data according to a neighboring relation of map elements, and the third map data is configured to eliminate a crack between adjacent map elements in the plurality of map elements contained in the second map data. After receiving the third map data, the electronic device renders and displays the electronic map in the second scale.

16 Claims, 5 Drawing Sheets

(56) References Cited

U.S. PATENT DOCUMENTS

| | | | |
|---|---|---|---|
| 2004/0225436 A1* | 11/2004 | Yoshihashi | G01S 5/0018 |
| | | | 701/532 |
| 2007/0229510 A1 | 10/2007 | Rey | |
| 2012/0262482 A1* | 10/2012 | Miwa | G09B 29/005 |
| | | | 345/629 |
| 2013/0321400 A1 | 12/2013 | Van Os | |
| 2014/0270525 A1* | 9/2014 | Thomee | G06T 5/002 |
| | | | 382/171 |
| 2016/0026860 A1* | 1/2016 | Dhein | G06F 16/29 |
| | | | 382/113 |
| 2018/0063513 A1* | 3/2018 | Bar | G03B 35/08 |
| 2018/0096498 A1* | 4/2018 | Hartmann | G06F 16/9538 |
| 2020/0104976 A1* | 4/2020 | Mammou | G06T 9/00 |

OTHER PUBLICATIONS

Steiniger, Stefan. Enabling pattern-aware automated map generalization. Diss. University of Zurich, 2007. (Year: 2007).*
The EESR of EP application No. 21163769.9.

* cited by examiner

METHOD FOR DISPLAYING ELECTRONIC MAP, ELECTRONIC DEVICE AND READABLE STORAGE MEDIUM

CROSS-REFERENCE TO RELATED APPLICATION

This application claims priority to Chinese Patent Application No. 202010930376.8, filed on Sep. 7, 2020, which is hereby incorporated by reference in its entirety.

TECHNICAL FIELD

Embodiments of the present application relate to the technical field of electronic maps and, in particular, to a method for displaying an electronic map, an electronic device and a readable storage medium.

BACKGROUND

With the rapid development of cities and the increase in road complexity, users' demands for electronic maps are becoming stronger and stronger. An electronic map is a map that is stored and viewed digitally using computer technologies.

A process of displaying an electronic map by an electronic device is actually a process of loading map data from a background server and displaying the same on a screen of the electronic device. The map data includes data related to a background surface of a map element such as land, a river, a lake, an island, etc. Generally, after the electronic map is displayed on the electronic device, a user can flexibly zoom in or zoom out the electronic map to obtain electronic maps in different scales, and sizes of map elements displayed in the electronic maps in different scales are different. For example, for a large-scale electronic map, a certain map element is represented by a point. For a small-scale electronic map, the same map element is represented by a surface. In order to obtain electronic maps in different scales, a common way is to draw a large-scale electronic map, and then automatically downsize map data of the large-scale electronic map to obtain a small-scale electronic map.

However, automatic downsizing of map data often causes problems in display of the electronic map, such as cracks between adjacent background surfaces, and background surface deformities.

SUMMARY

The present application provides a method for displaying an electronic map, an electronic device and a readable storage medium, the purpose of correctly displaying the electronic map when switching between different scales can be realized by automatic topology correction.

In a first aspect, an embodiment of the present application provides a method for displaying an electronic map, the method includes: receiving a downsizing instruction from an electronic device, where the downsizing instruction is configured to request for downsizing an electronic map in a first scale currently displayed by the electronic device to an electronic map in a second scale, and the second scale is smaller than the first scale; in response to the downsizing instruction, generating second map data corresponding to the second scale using first map data collected by the electronic map under the first scale; processing the second map data according to a neighboring relation of map elements to obtain third map data, so as to eliminate a crack between adjacent map elements in the second map data; and sending the third map data to the electronic device, so that the electronic device displays the electronic map in the second scale according to the third map data.

In a possible design, the processing the second map data according to a neighboring relation of map elements to obtain third map data includes: determining first background surface data and second background surface data from the second map data according to the neighboring relation of map elements, where the first background surface data is configured to display a first background surface, the second background surface data is configured to display a second background surface, the first background surface corresponds to a first map element, the second background surface corresponds to a second map element, and the first map element and the second map element are two adjacent map elements in the electronic map; determining whether there exists a crack between the first background surface and the second background surface according to the first background surface data and the second background surface data; and processing the first background surface data and the second background surface data to eliminate the crack between the first background surface and the second background surface if there exists the crack between the first background surface and the second background surface.

In a possible design, the in response to the downsizing instruction, generating second map data corresponding to the second scale using first map data collected by the electronic map under the first scale includes: determining a preset number of spatial points from the first map data in response to the downsizing instruction, where the spatial points are points displayed on the electronic map in the first scale but not displayed on the electronic map in the second scale; and deleting the preset number of spatial points from the first map data to obtain the second map data corresponding to the second scale.

In a possible design, the processing the first background surface data and the second background surface data to eliminate the crack between the first background surface and the second background surface if there exists the crack between the first background surface and the second background surface includes: determining a first side on the first background surface and a second side on the second background surface, where there exists a crack between the first side and the second side; determining a common side according to the first side and the second side; and adjusting the first background surface and the second background surface according to the common side, so that the first background surface and the second background surface adjoin each other.

In a possible design, before the processing the second map data according to a neighboring relation of map elements to obtain third map data, so as to eliminate a crack between adjacent map elements in the second map data, the method further includes: collecting the first map data according to the first scale, where the first map data includes a plurality pieces of background surface data, and different background surface data in the plurality pieces of background surface data are configured to display different map elements; and determining a neighboring relation set according to the plurality pieces of background surface data, where the neighboring relation set includes the neighboring relation of map elements.

In a possible design, the determining a neighboring relation set according to the plurality pieces of background surface data includes: determining an out surrounding frame corresponding to each of the plurality pieces of background surface data to obtain a plurality of out surrounding frames; determining intersecting out surrounding frames from the plurality of out surrounding frame to obtain a plurality of out surrounding frame groups, where two out surrounding frames contained in each of the plurality of out surrounding frame groups intersect; for each of the plurality of out surrounding frame groups, determining whether map elements corresponding to out surrounding frames in the out surrounding frame group are adjacent; and storing a neighboring relation in the neighboring relation set if the map elements corresponding to out surrounding frames in the out surrounding frame group are adjacent.

In a possible design, after the processing the second map data according to a neighboring relation of map elements to obtain third map data, so as to eliminate a crack between adjacent map elements in the second map data, the method further includes: determining third background surface data from the third map data, where the third background surface data is configured to display a third background surface, and the third background surface is any one of a plurality of background surfaces indicated by the third map data; dividing the third background surface into a plurality of triangles, where any two triangles of the plurality of triangles do not intersect; and performing accuracy processing on the third background surface data according to the plurality of triangles.

In a possible design, the performing accuracy processing on the third background surface data according to the plurality of triangles includes: determining accuracy information corresponding to the second scale; and performing accuracy processing on the third background surface data according to the accuracy information and the plurality of triangles.

In a second aspect, an embodiment of the present application provides apparatus for displaying an electronic map, the apparatus includes:

a receiving unit, configured to receive a downsizing instruction from an electronic device, where the downsizing instruction is configured to request for downsizing an electronic map in a first scale currently displayed by the electronic device to an electronic map in a second scale, and the second scale is smaller than the first scale;

a generating unit, configured to: in response to the downsizing instruction, generate second map data corresponding to the second scale using first map data collected by the electronic map under the first scale;

a processing unit, configured to process the second map data according to a neighboring relation of map elements to obtain third map data, so as to eliminate a crack between adjacent map elements in the second map data; and a sending unit, configured to send the third map data to the electronic device, so that the electronic device displays the electronic map in the second scale according to the third map data.

In a possible design, the processing unit is configured to: determine first background surface data and second background surface data from the second map data according to the neighboring relation of map elements, where the first background surface data is configured to display a first background surface, the second background surface data is configured to display a second background surface, the first background surface corresponds to a first map element, the second background surface corresponds to a second map element, and the first map element and the second map element are two adjacent map elements in the electronic map; determine whether there exists a crack between the first background surface and the second background surface according to the first background surface data and the second background surface data; and process the first background surface data and the second background surface data to eliminate the crack between the first background surface and the second background surface if there exists the crack between the first background surface and the second background surface.

In a possible design, if there exists the crack between the first background surface and the second background surface, when processing the first background surface data and the second background surface data to eliminate the crack between the first background surface and the second background surface, the processing unit is configured to: determine a first side on the first background surface and a second side on the second background surface, where there exists a crack between the first side and the second side; determine a common side according to the first side and the second side; and adjust the first background surface and the second background surface according to the common side, so that the first background surface and the second background surface adjoin each other.

In a possible design, the generating unit is configured to: determine a preset number of spatial points from the first map data in response to the downsizing instruction, where the spatial points are points displayed on the electronic map in the first scale but not displayed on the electronic map in the second scale; and delete the preset number of spatial points from the first map data to obtain the second map data corresponding to the second scale.

In a possible design, before processing the second map data according to a neighboring relation of map elements to obtain third map data, so as to eliminate a crack between adjacent map elements in the second map data, the processing unit is further configured to: collect the first map data according to the first scale, where the first map data includes a plurality pieces of background surface data, and different background surface data in the plurality pieces of background surface data are configured to display different map elements; and determine a neighboring relation set according to the plurality pieces of background surface data, where the neighboring relation set includes the neighboring relation of map elements.

In a possible design, when determining a neighboring relation set according to the plurality pieces of background surface data, the processing unit is configured to: determine an out surrounding frame corresponding to each of the plurality pieces of background surface data to obtain a plurality of out surrounding frames; determine intersecting out surrounding frames from the plurality of out surrounding frame to obtain a plurality of out surrounding frame groups, where two out surrounding frames contained in each of the plurality of out surrounding frame groups intersect; for each of the plurality of out surrounding frame groups, determine whether map elements corresponding to out surrounding frames in the out surrounding frame group are adjacent; and store a neighboring relation in the neighboring relation set if the map elements corresponding to out surrounding frames in the out surrounding frame group are adjacent.

In a possible design, after processing the second map data according to a neighboring relation of map elements to obtain third map data, so as to eliminate a crack between adjacent map elements in the second map data, the processing unit is further configured to: determine third background surface data from the third map data, where the third background surface data is configured to display a third background surface, and the third background surface is any one of a plurality of background surfaces indicated by the third map data; divide the third background surface into a plurality of triangles, where any two triangles of the plurality of triangles do not intersect; and perform accuracy processing on the third background surface data according to the plurality of triangles.

In a possible design, when performing accuracy processing on the third background surface data according to the plurality of triangles, the processing unit is configured to: determine accuracy information corresponding to the second scale; and perform accuracy processing on the third background surface data according to the accuracy information and the plurality of triangles.

In the third aspect, an embodiment of the present application provides an electronic device, the apparatus includes:
at least one processor; and
a memory in a communicative connection with the at least one processor;
where the memory stores instructions thereon, and the instructions, when executed by the at least one processor, cause the at least one processor to perform the method or any possible implementing form of the first aspect.

In a fourth aspect, an embodiment of the present application provides a computer program product containing instructions, the computer program product, when running on an electronic device, causes the electronic device to perform the method or various possible implementing forms of the first aspect.

In a fifth aspect, an embodiment of the present application provides a non-transitory computer-readable storage medium having computer instructions stored thereon, the computer instructions, when executed, cause the computer to perform the method or various possible implementing forms of the first aspect.

In a sixth aspect, an embodiment of the present application provides apparatus for displaying an electronic map, the apparatus includes: determining adjacent map elements in an electronic map when the electronic map is downsized from a first scale to a second scale, determining whether corresponding background surfaces of the adjacent map elements have a continuous common side; and correcting the corresponding background surfaces of the adjacent map elements if the corresponding background surfaces of the adjacent map elements have no continuous common side.

One of the above embodiments of the present application has the following advantages or beneficial effects: the purpose of correctly displaying an electronic map when switching between different scales can be realized by automatic topology correction.

It should be understood that the content described in this section is not intended to identify the key or important features of the embodiments of the present application, nor is it intended to limit the scope of the present application. Other features of the present application will be easily understood by the following description.

BRIEF DESCRIPTION OF DRAWINGS

The drawings are used to better understand the solution, and do not constitute a limitation to the present application. Where.

DESCRIPTION OF EMBODIMENTS

Figure 1:
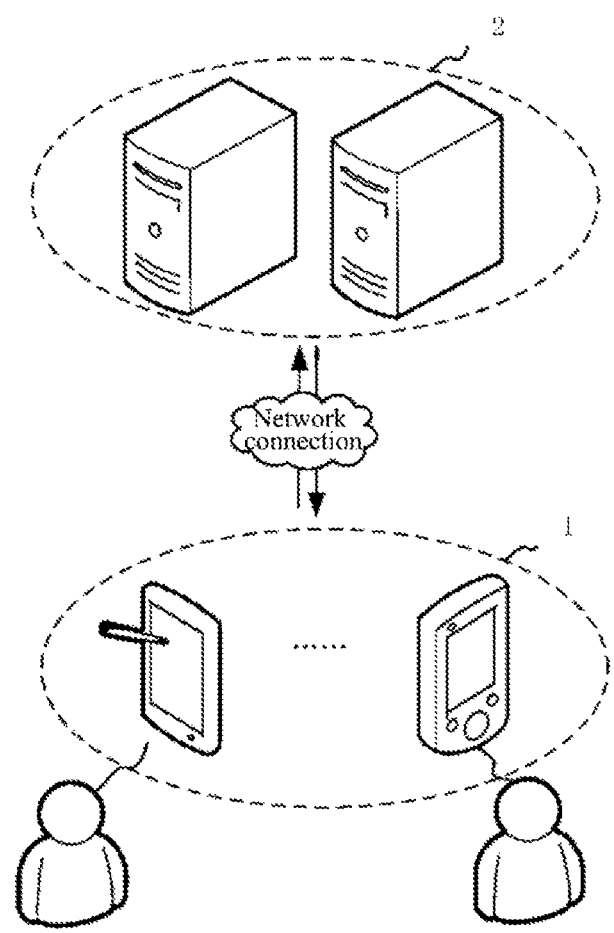
FIG. 1 is a schematic diagram of a network architecture to which a method for displaying an electronic map according to an embodiment of the present application is applicable.

Exemplary embodiments of the present application is described in the following with reference to the accompanying drawings, and various details of the embodiments of the present application are included to facilitate understanding, and should be considered as merely exemplary. Therefore, those of ordinary skill in the art should appreciate that various changes and modifications can be made to the embodiments described herein without departing from the scope and spirit of the present application. Likewise, for clarity and conciseness, descriptions of well-known functions and structures are omitted in the following description.

With the rapid development of technologies, maps have changed from traditional paper maps to electronic maps, which are also known as digital maps, Internet maps, etc. Maps are divided in terms of scales, and maps in different scales contain different types and levels of elements. In the drawing process of a traditional paper map, large-scale map data is collected, and the map is drawn based on the large-scale map data. When downsizing from a large scale to a small scale, a large amount of manpower is often needed for comprehensive processing, so as to output a small-scale map that meets the needs.

Unlike paper maps, electronic maps often cannot be downsized manually. At the same time, when an electronic map is made to update, it is impossible to only update the large-scale electronic map, but to update the small-scale electronic map at a low frequency. The Douglas-Puck method and grid precision reduction method are usually used to automatically downsize the electronic map. However, these methods often cause the electronic map to be deformed or cracked, which has a serious impact on the expression efficiency of the electronic map. Especially for important map elements such as rivers, due to automatic thinning, it is easy to cause river cut-off, thereby resulting in problem maps. Problem maps are also known as error maps, by which users are easily misled.

The conventional processing method is to process the background surface of each map element separately, which will cause problems such as cracks, thereby resulting in badcase in the expression of electronic maps.

The embodiments of the present application provide a method for displaying an electronic map, an electronic device and a readable storage medium, and the purpose of correctly displaying the electronic map when switching between different scales can be realized by automatic topology correction.

FIG. 1 is a schematic diagram of a network architecture to which a method for displaying an electronic map according to an embodiment of the present application is applicable. Referring to FIG. 1, the network architecture includes an electronic device 1 and a server 2, and a network connection is established between the electronic device 1 and the server 2. The first map data of a first scale and a neighboring relation set are pre-stored in the server 2. The first map data includes point of interest (POI), linear data, or background surface data. The background surface data is configured to display planar map elements, such as rivers, lakes, and islands. Map elements are usually represented by background surfaces. For example, an island is represented by a background surface equivalent to an irregular or regular polygon. If two map elements are adjacent, the background surfaces corresponding to the two map elements have a continuous common side; if two map elements are not adjacent, the background surfaces corresponding to the two map elements does not have a common side. The neighboring relation set stores a plurality of map element groups, and two map elements belonging to the same group have a common side. In addition, the neighboring relation set also stores the common side of the background surfaces corresponding to two adjacent map elements.

When a user uses an electronic device to navigate or query a route, the electronic device loads map data from a background server and displays the electronic map on the screen of the electronic device. After that, the user can zoom the electronic map through operations such as mouse scrolling or touch. When the electronic map is downsized from the first scale to a second scale, the server determines second map data from the first map data. When cracks occur in the electronic map in the second scale displayed based on the second map data, the server corrects the second map data according to the neighboring relation set to obtain third map data. Then, the server sends the third map data to the electronic device for the electronic device to display the electronic map in the second scale with cracks eliminated.

In FIG. 1, the electronic device 1 may be a desktop terminal or a mobile terminal, the desktop terminal may be a computer, etc., the mobile terminal may be a mobile phone, a tablet personal computer, a laptop, etc., and the server 2 may be an independent server, or a server cluster composed of a plurality of servers, etc.

Figure 2:
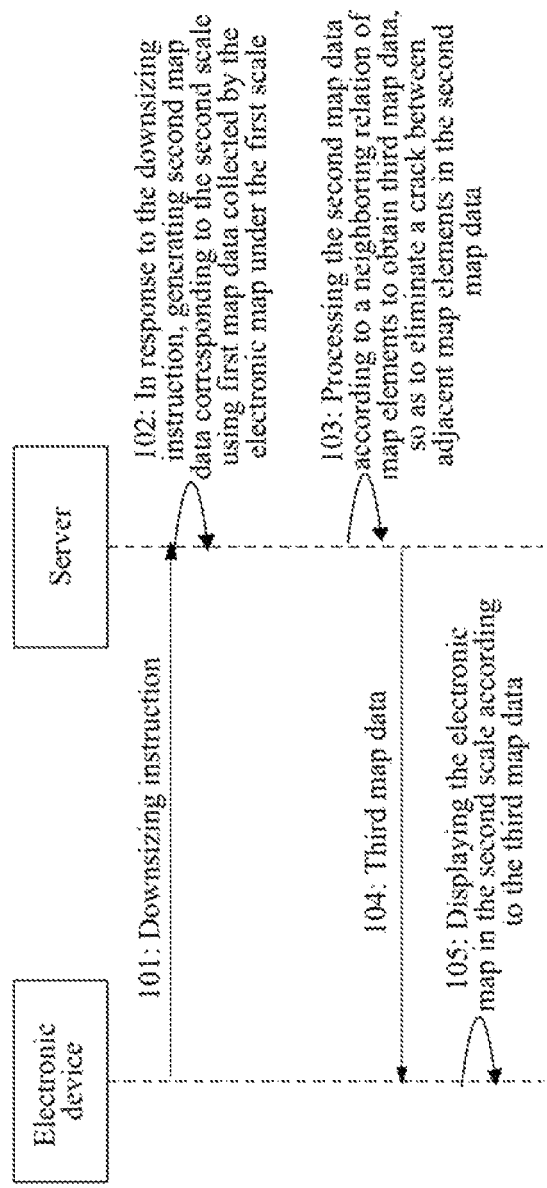
FIG. 2 is a flowchart of a method for displaying an electronic map according to an embodiment of the present application.

FIG. 2 is a flowchart of a method for displaying an electronic map according to an embodiment of the present application, the embodiment is described from the perspective of a server, and includes:

101, receiving a downsizing instruction from an electronic device.

The downsizing instruction is configured to request for downsizing an electronic map in a first scale currently displayed by the electronic device to an electronic map in a second scale, and the second scale is smaller than the first scale.

In the embodiments of the present application, map downsizing means: a small-scale electronic map is output by deleting some map spatial points through a certain algorithm based on large-scale first map data, so as to ensure the scientificity and usability of the electronic map. The large scale is the aforesaid first scale, such as 1:100, and the small scale is the aforesaid second scale, such as 1:1000, and 1:5000.

When the user uses the electronic device to navigate or query the route, the electronic device is triggered to send a downsizing instruction to the server. For example, the electronic device is a laptop or a desktop computer, and when the user queries the navigation route by scrolling the mouse, the electronic device is triggered to send the downsizing instruction to the server. For example, the electronic device is a mobile phone of the user, and when the user performs a zooming in or zooming out operation on the touch screen, so that the electronic device is triggered to send the downsizing instruction to the server.

102, in response to the downsizing instruction, generating second map data corresponding to the second scale using first map data collected by the electronic map under the first scale.

Illustratively, maps are divided in terms of scales, and maps in different scales contain different types and levels of elements. According to the requirements of the first scale for display elements, the first map data is collected and stored in advance. The first map data includes a plurality of map spatial points, which are classified into POI, linear data, or background surface data.

After receiving the downsizing instruction, in response to the downsizing instruction, the server deletes some map spatial points based on a certain algorithm from the first map data to obtain second map data, thus realizing the purpose of downsizing the electronic map in the first scale to the electronic map in the second scale.

103, processing the second map data according to a neighboring relation of map elements to obtain third map data, so as to eliminate a crack between adjacent map elements in the second map data.

The third map data is configured to eliminate a crack between adjacent map elements in the plurality of map elements corresponding to the second map data.

During the process of map downsizing, since the background surfaces are processed one by one, it is very likely to cause cracks between two adjacent background surfaces. To this end, cracks need to be repaired. During the repair process, the neighboring relation of map elements is stored in advance. During the process of downsizing, the neighboring relation between map elements is used to correct the second map data, so as to eliminate the crack between two adjacent background surfaces. Hereinafter, the repaired second map data is referred to as the third map data.

104, sending the third map data to the electronic device.

105, the electronic device displays the electronic map in the second scale according to the third map data.

Exemplarily, the server sends the third map data to the electronic device via WiFi. After receiving the third map data, the electronic device renders and displays the electronic map in the second scale.

In the method for displaying the electronic map according to the embodiment of the present application, after receiving the downsizing instruction from the electronic device, the server generates the second map data under the second scale according to the first map data under the first scale, and obtains the third map data by repairing the second map data according to the neighboring relation of map elements, and the third map data is configured to eliminate the crack between adjacent map elements in the plurality of map elements corresponding to the second map data. After receiving the third map data, the electronic device renders and displays the electronic map in the second scale. In this way, the purpose of correctly displaying the electronic map when switching between different scales can be realized by automatic topology correction.

In the above embodiment, when processing the second map data according to the neighboring relation of map elements to obtain the third map data, the server determines first background surface data and second background surface data from the second map data, determines whether there exists a crack between the first background surface and the second background surface according to the first background surface data and the second background surface data, and processes the first background surface data and the second background surface data to eliminate the crack between the first background surface and the second background surface if there exists the crack between the first background surface and the second background surface. The first background surface data is configured to display a first background surface, the second background surface data is configured to display a second background surface, the first background surface corresponds to a first map element, the second background surface corresponds to a second map element, and the first map element and the second map element are two adjacent map elements in the electronic map.

Exemplarily, the first map data includes background surface data, POI, or linear data. Different map elements correspond to different background surface data. The background surface data of a map element is actually a collection of a series of points, for example, the background surface data of a map element of a lake is actually the latitude and longitude coordinates of a series of points by the lake. It can be seen that: from the perspective of background surface data, the first map data contains a plurality of data sets, and different background surfaces correspond to different data sets.

The difference between the second map data and the first map data is that: for any map element, some map spatial points are removed from the data sets contained in the first map data to obtain the second map data. That is, from the perspective of background surface data, the second map data actually also contains a plurality of data sets, and the spatial points in these data sets are relatively fewer. Since each background surface is a polygon, the process of deleting some spatial points in the background surface data is a process of simplifying the polygon corresponding to the background surface. Therefore, it can also be understood that the process of generating the second map data according to the first map data is to simplify the polygons corresponding to respective background surfaces.

Since maps are divided in terms of scales, maps in different scales contain different types and levels of elements. Therefore, the server determines, according to the scale, which spatial points to delete, and the spatial points to be deleted are different for different scales. The spatial points to be deleted are points displayed on the electronic map in the first scale but not displayed on the electronic map in the second scale. During the deletion process, the server determines a preset number of spatial points from the first map data, and these spatial points are points displayed on the electronic map in the first scale but not displayed on the electronic map in the second scale. Then, the server deletes the preset number of spatial points from the first map data to obtain the second map data corresponding to the second scale.

In this way, the second map data is obtained by deleting some spatial points in the first map data, thereby the automatic map data downsizing is realized.

The above simplification process may cause cracks. Exemplarily, please refer to FIG. 3.

Figure 3:
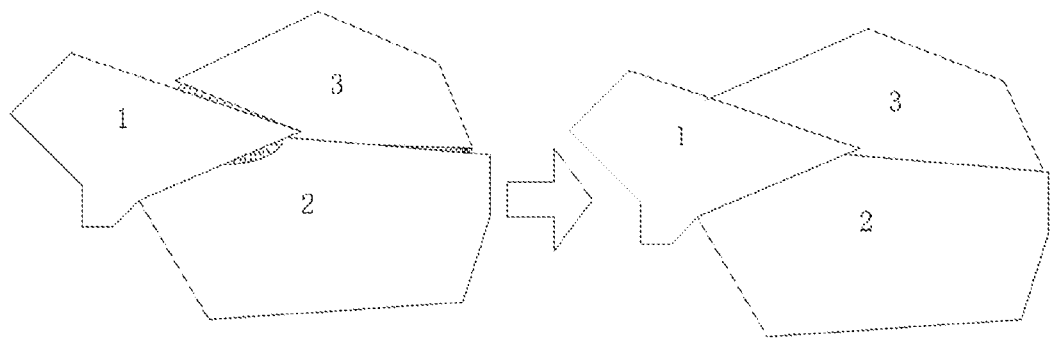
FIG. 3 is a schematic diagram of cracks in a method for displaying an electronic map according to an embodiment of the present application.

FIG. 3 is a schematic diagram of cracks in a method for displaying an electronic map according to an embodiment of the present application. Referring to 3, the first map data is downsized to obtain the second map data, and the second map data is configured to display map elements a, b, and c. Irregular polygons 1, 2, and 3 are the background surfaces corresponding to the map elements a, b, and c, respectively. The map elements a, b, and c are adjacent to one another. Due to the downsizing, a crack appears between polygons 1 and 2, a crack appears between polygons 2 and 3, and a crack appears between polygons 3 and 1. The cracks are shown as the parts filled with horizontal lines in the figure.

In order to solve the problem of cracks caused by downsizing, after obtaining the second map data, the server determines which background surfaces are adjacent background surfaces according to the pre-stored neighboring relation set. Hereinafter, the two adjacent background surfaces are referred to as a first background surface and a second background surface. After determining the first background surface and the second background surface, the server determines the first background surface data and the second background surface data from the second map data. After that, it is determined whether the two background surfaces have a common side according to the first background surface data and the second background surface data. If the two background surfaces have no common side, it means that there is a crack.

Still referring to FIG. 3, the server finds that polygons 1 and 2 are adjacent according to the neighboring relation of map elements. However, by using the first background surface data and the second background surface data, it is found that there is no common side between the polygon 1 and the polygon 2, or even if there is a common side between the polygon 1 and the polygon 2, the common side is not continuous. At this time, the server processes the first background surface data and the second background surface data to eliminate the crack between the first background surface and the second background surface.

For example, the server determines a first point from the first background surface data and a second point from the second background surface data, determines a third point based on coordinates of the two points, and uses the third point as a point on the common side. For another example, the server determines a first side on the first background surface and a second side on the second background surface, with a crack between the first side and the second side, determines a common side according to the first side and the second side, and adjusts the first background surface and the second background surface according to the common side, so that the first background surface and the second background surface are adjacent. During the adjustment process, the server expands the first background surface and the second background surface towards the direction of the common side, so that the first background surface and the second background surface share a common side. Finally the third map data is obtained, the background surface displayed based on the third map data is shown on the right side of FIG. 3.

In this way, the downsized second map data is processed through the pre-built neighboring relation to ensure that the adjacent background surfaces maintain a neighboring relation, thereby reducing the cracks caused by downsizing.

In the above embodiment, before determining the first background surface data and the second background surface data from the second map data according to the neighboring relation of map elements, the server also needs to build the neighboring relation, that is, to acquire the neighboring relation set, which contains the neighboring relation of map elements. During the acquisition process, the server collects the first map data according to the first scale, and determines the neighboring relation set according to the plurality pieces of background surface data. The first map data includes a plurality pieces of background surface data, and different background surface data in the plurality pieces of background surface data are configured to display different map elements.

Exemplarily, the first scale is a large scale, such as 1:100, 1:1000000, etc. For each map element, according to the requirements of the first scale, the background surface data of each map element is collected in advance using a collection vehicle, etc., and the sum of the background surface data is the first map data. After obtaining the first map data, the server determines the neighboring relation set according to the first map data. For example, the background surface data corresponding to two adjacent map elements are labeled, and the neighboring relation set is generated according to the labels. For example, if a lake and a lawn are adjacent, the background surface data corresponding to the lake is marked as "HL", the background surface data corresponding to the lawn is marked as "CL", and the server generates a group of neighboring relation based on the two marks and stores it. For another example, the server calculates each background surface data according to a preset algorithm, thereby determining the adjacent background surfaces and storing the neighboring relation.

In this way, the server generates a neighboring relation set according to the first map data under the first scale, so that the second map data obtained by downsizing is corrected according to the neighboring relation in the subsequent downsizing process to ensure that the adjacent background surfaces maintain a neighboring relation, thereby reducing the cracks caused by downsizing.

Figure 4:
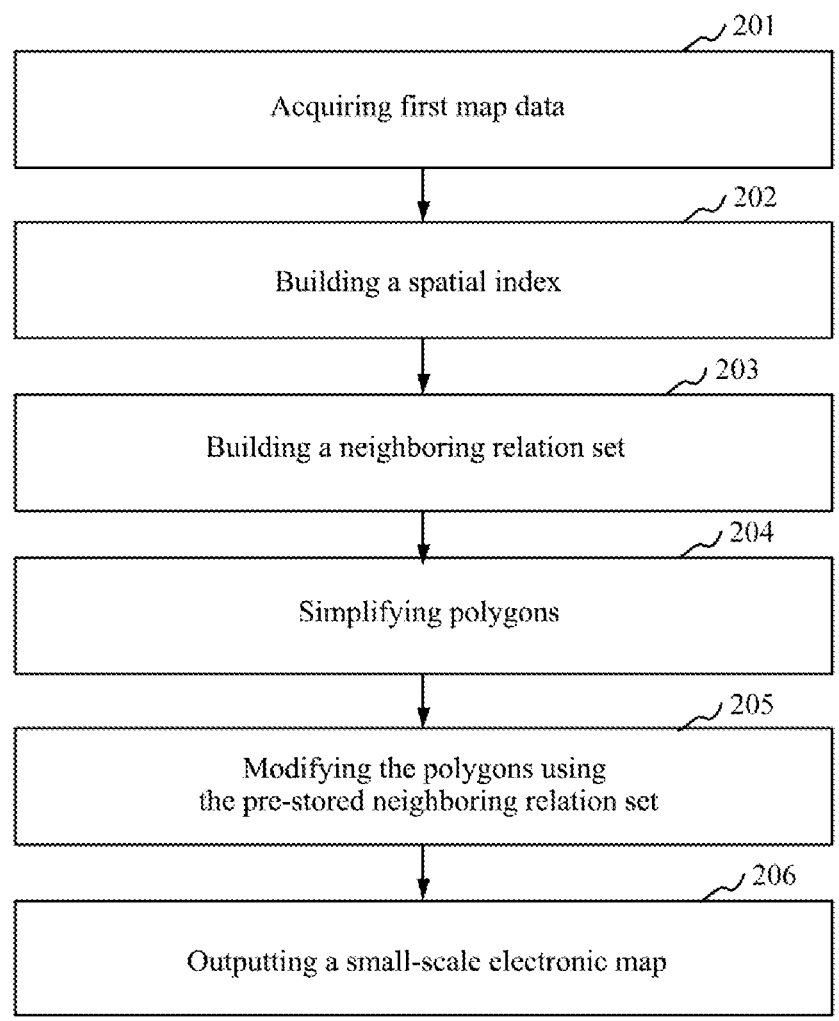
FIG. 4 is a schematic diagram of a process of a method for displaying an electronic map according to an embodiment of the present application.

FIG. 4 is a schematic diagram of a process of a method for displaying an electronic map according to an embodiment of the present application. Referring to FIG. 4, this embodiment includes the following steps:

201, acquiring first map data.

Exemplarily, the first map data is collected by a collecting vehicle or the like according to display elements of a first scale, and a server acquires the first map data. The first map data mainly includes a plurality pieces of background surface data. Different background surface data correspond to different map elements. Each background surface data contains coordinates of a plurality of spatial points.

202, building a spatial index.

In this step, the server determines an out surrounding frame corresponding to each of the plurality pieces of background surface data contained in the first map data to obtain a plurality of out surrounding frames.

For each background surface data, the server determines the out surrounding frame corresponding to the background surface data. For example, the server determines points 1 and 2 from the background surface data, the point 1 is a point with the smallest abscissa and the smallest ordinate in the background surface data, and the point 2 is a point with the largest abscissa and the largest ordinate in the background surface data. Then, the server makes a rectangle with a line segment between the point 1 and the point 2 as a diagonal to obtain the out surrounding frame.

It should be noted that the embodiments of the present application do not limit the determination method of the out surrounding frame. For example, the point 1 is a point with the smallest abscissa in the background surface data, and the point 2 is a point with the largest abscissa in the background surface data. For another example, the point 1 is a point with the smallest ordinate in the background surface data, and the point 2 is a point with the largest ordinate in the background surface data. For another example, the server determines points whose abscissas and ordinates meet certain conditions from the background surface data, and determines the point 1 based on these points; in the same way, the server determines the point 2.

203, building a neighboring relation set.

After determining the out surrounding frames, the server determines intersecting out surrounding frames from the plurality of out surrounding frames to obtain a plurality of out surrounding frame groups, with two out surrounding frames contained in each of the plurality of out surrounding frame groups intersecting; For each of the plurality of out surrounding frame groups, the server determines whether map elements corresponding to out surrounding frames in the out surrounding frame group are adjacent. And the neighboring relation is stored in the neighboring relation set if the map elements corresponding to out surrounding frames in the out surrounding frame group are adjacent.

Exemplarily, for any two out surrounding frames in the plurality of out surrounding frames, the server judges whether the two out surrounding frames intersect. If the two out surrounding frames intersect, the server continues to determine whether the map elements corresponding to the two out surrounding frames are adjacent. For example, the server determines the background surfaces of the map elements corresponding to the two out surrounding frames, and then judges whether the two background surfaces have a common side. If the two background surfaces have a common side, it means that the two map elements are adjacent, and the server stores the neighboring relation. If the two background surfaces have no common side, it means that the two map elements are not adjacent. After the server judges each pair of out surrounding frames, the neighboring relation set can be obtained.

204, simplifying polygons.

After the server obtains the neighboring relation set, subsequently, when the user zooms the map through the touch screen, the downsizing of the electronic map from the first scale to a second scale is triggered, and the second map data corresponding to the second scale is generated based on the first map data collected under the first scale, and the second scale is smaller than the first scale. At this time, for each map element, the data in the background surface data corresponding to the map element needs to be reduced, that is, to delete some space. Taking a city map as an example, the first scale is 1:100, and the second scale is 1:1000. The electronic map in the first scale needs to display 1000 points of the map element, and the electronic map in the second scale is obtained after downsizing, for the same map element, only 100 points need to be displayed.

205, modifying the polygons using the pre-stored neighboring relation set.

The above process of simplifying polygons is the map downsizing process. During the downsizing process, some points are deleted, which may cause cracks. In order to eliminate the cracks, the server uses the pre-stored neighboring relation set to modify the polygons.

During the modification process, the server processes the second map data to obtain third map data, so as to eliminate the cracks between adjacent map elements in the plurality of map elements corresponding to the second map data.

206, outputting a small-scale electronic map.

Exemplarily, the server sends the third map data to the electronic device, so that the electronic device displays the electronic map in the second scale (that is, the small-scale electronic map) according to the third map data.

In this way, the server modifies the downsized second map data according to the pre-stored neighboring relation set to ensure that adjacent background surfaces maintain a neighboring relation, thereby reducing the cracks caused by map downsizing.

In the above embodiment, in order to reduce the data size of the vector mesh, the server often normalizes the third data, which results in a decrease in data accuracy. The traditional normalization method is mainly the mesh simplification method, that is, coordinates of all points in a mesh are normalized to a coordinate of a lower left corner of the mesh. For example, if the abscissa of a certain point is 101.55, and the abscissa of another point is 101.49, the server normalizes the abscissas of the two points to 100 or 101, resulting in reduced data and reduced data accuracy. However, the normalization of mesh coordinates easily introduces the problem of polygonal self-intersection, which causes the background surface corresponding to the map element to be deformed, thereby producing a problem map.

In the embodiments of the present application, a map element corresponds to a background surface, and the background surface is a regular or irregular polygon. Polygonal self-intersection refers to intersection of two sides of a polygon. Exemplarily, referring to FIG. 5, FIG. 5 is a schematic diagram of polygonal self-intersection in a method for displaying an electronic map according to an embodiment of the present application.

Figure 5:
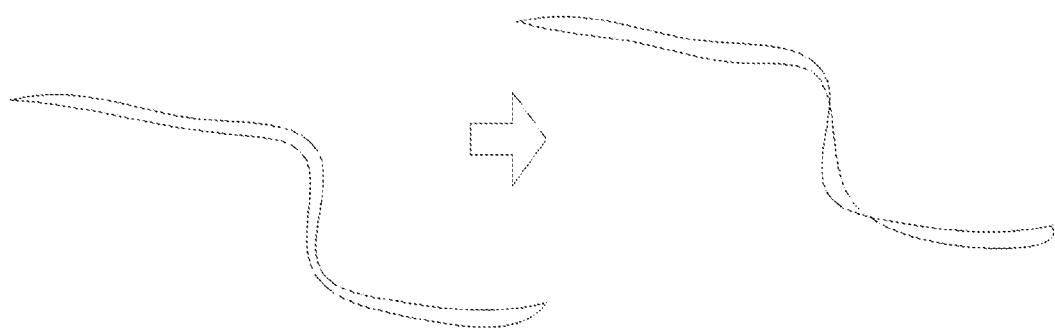
FIG. 5 is a schematic diagram of polygonal self-intersection in a method for displaying an electronic map according to an embodiment of the present application.

Referring to FIG. 5, the map element is a river. Under normal circumstances, the background surface of the map element is the polygon as shown on the left side of FIG. 5. After downsizing, the problem of polygonal self-intersection occurs. The self-intersecting polygon is shown on the right side of FIG. 5. Obviously, there is a problem with the display of the map element after downsizing.

In order to solve this problem, after processing the second map data according to the pre-stored neighboring relation set to obtain third map data, the server further determines third background surface data from the third map data. The third background surface data is configured to display a third background surface, and the third background surface is any one of a plurality of background surfaces indicated by the third map data. Then, the server divides the third background surface into a plurality of triangles according to the third background surface data, and any two triangles of the plurality of triangles do not intersect. Finally, the server simplifies the third background surface according to the plurality of triangles.

Exemplarily, for a map element, the server determines the background surface data of the map element, which is hereinafter referred to as the third background surface data, from the third map data. Then, the server calculates a polygon based on the third background surface data, and the polygon is the third background surface. After that, the server forms a triangle with three adjacent points on the third background surface, thereby obtaining a plurality of triangles, and any two triangles of these triangles do not intersect. Finally, the server simplifies the third background surface according to these disjoint triangles.

In this way, by transforming a complex polygon into simple triangles, mesh simplification based on triangles is adopted to avoid the polygonal self-intersection caused by mesh simplification.

Figure 6:
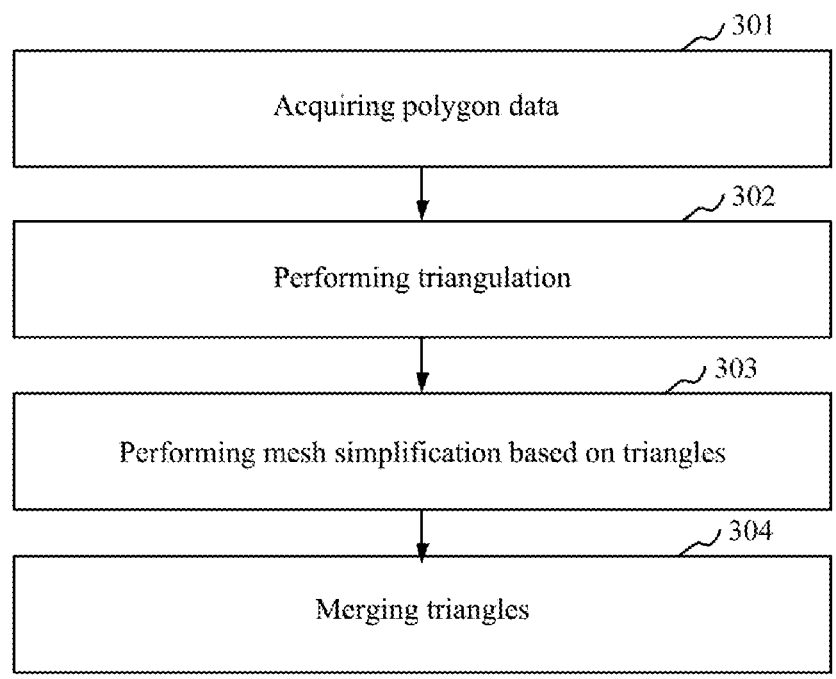
FIG. 6 is a schematic diagram of a process of mesh simplification based on triangles in a method for displaying an electronic map according to an embodiment of the present application.

FIG. 6 is a schematic diagram of a process of mesh simplification based on triangles in a method for displaying an electronic map according to an embodiment of the present application, and it includes:

301, acquiring polygon data.

Exemplarily, a map element corresponds to a background surface, and the background surface is a regular or irregular polygon. The third map data is actually a collection of respective background surface data of a plurality of map elements. For each map element, the server acquires the background surface data corresponding to the map element, and the background surface data is also known as the polygon data.

The third background surface displayed by the background surface data acquired by the server is shown on the left side of FIG. 5. If the traditional mesh simplification method is adopted, the polygonal self-intersection is prone to occur. Therefore, the present application adopts the following triangle-based mesh simplification.

302, performing triangulation.

The server divides the third background surface into a plurality of triangles, and any two triangles in the plurality of triangles do not intersect. For example, the server sequentially uses three relatively close points as vertices of a triangle, thereby obtaining a plurality of triangles. For another example, the server uses a certain point as a reference point and connects the reference point with other points, thereby dividing the third background surface into a plurality of triangles.

303, performing mesh simplification based on triangles.

Exemplarily, the server processes vertices of each triangle according to accuracy requirements, and the accuracy requirements under different scales are different. For example, the scale of 1:100 and the scale of 1:2000 require different accuracies. Therefore, the server determines the accuracy information corresponding to the second scale, and performs accuracy processing on the third background surface data according to the accuracy information and the plurality of triangles.

For example, the second scale is 1:1000, and the required data accuracy is a multiple of 100. Assuming that the abscissas of the three vertices of a triangle are 101, 101.55, and 102 respectively, after the accuracy processing, the abscissas of the three vertices are changed to 100.

For another example, the second scale is 1:5000, and the required data accuracy is to keep 1 decimal place, after processing, the abscissas of the three vertices are changed to 101, 10.15, and 10.2.

In this way, by setting different accuracy requirements for different scales, the purpose of ensuring data accuracy as much as possible in the accuracy processing is achieved.

304, merging triangles.

In this step, all the simplified triangles are merged to restore a polygon. Compared with the original polygon, that is, the polygon as shown on the left side of FIG. 5, the shape and position of the polygon obtained by triangle-based mesh simplification and merging are slightly changed.

In this embodiment, a complex polygon is transformed into simple triangles. After accuracy processing is performed on the three vertices of a triangle, the processed three points may be expressed as a triangle, a line segment, or a point, thereby avoiding self-intersection.

The specific implementations of the method for displaying the electronic map mentioned in the embodiments of the present application are introduced above. The following are apparatus embodiments of the present application, for performing the method embodiments of the present application. For details not disclosed in the apparatus embodiments of the present application, reference may be made to the method embodiments of the present application.

Figure 7:
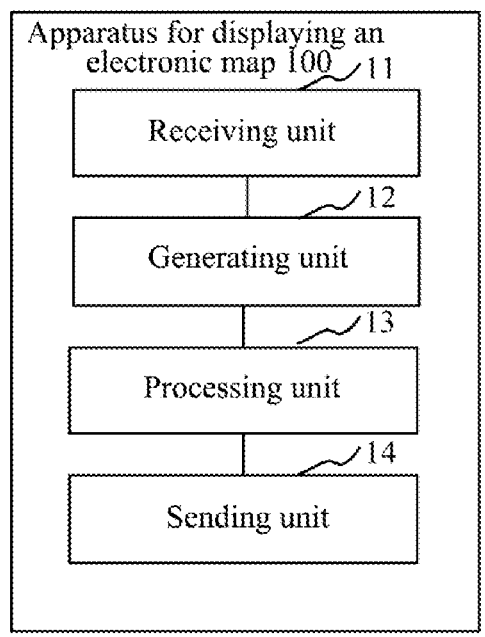
FIG. 7 is a schematic structural diagram of apparatus for displaying an electronic map according to an embodiment of the application.

FIG. 7 is a schematic structural diagram of apparatus for displaying an electronic map according to an embodiment of the application. The apparatus may be integrated in the server or implemented by the server. As shown in FIG. 7, in this embodiment, the apparatus for displaying an electronic map 100 may include: a receiving unit 11, a generating unit 12, a processing unit 13, and a sending unit 14. Where:

the receiving unit 11 is configured to receive a downsizing instruction from an electronic device, where the downsizing instruction is configured to request for downsizing an electronic map in a first scale currently displayed by the electronic device to an electronic map in a second scale, and the second scale is smaller than the first scale;

the generating unit 12 is configured to: in response to the downsizing instruction, generate second map data corresponding to the second scale using first map data collected by the electronic map under the first scale;

the processing unit 13 is configured to process the second map data according to a neighboring relation of map elements to obtain third map data, so as to eliminate a crack between adjacent map elements in the second map data; and the sending unit 14 is configured to send the third map data to the electronic device, so that the electronic device displays the electronic map in the second scale according to the third map data.

In a possible design, the processing unit 13 is configured to: determine first background surface data and second background surface data from the second map data according to the neighboring relation of map elements, where the first background surface data is configured to display a first background surface, the second background surface data is configured to display a second background surface, the first background surface corresponds to a first map element, the second background surface corresponds to a second map element, and the first map element and the second map element are two adjacent map elements in the electronic map; determine whether there exists a crack between the first background surface and the second background surface according to the first background surface data and the second background surface data; and process the first background surface data and the second background surface data to eliminate the crack between the first background surface and the second background surface if there exists the crack between the first background surface and the second background surface.

In a possible design, if there exists the crack between the first background surface and the second background surface, when processing the first background surface data and the second background surface data to eliminate the crack between the first background surface and the second background surface, the processing unit 13 is configured to: determine a first side on the first background surface and a second side on the second background surface, where there exists a crack between the first side and the second side; determine a common side according to the first side and the second side; and adjust the first background surface and the second background surface according to the common side, so that the first background surface and the second background surface adjoin each other.

In a possible design, the generating unit 12 is configured to: determine a preset number of spatial points from the first map data in response to the downsizing instruction, where the spatial points are points displayed on the electronic map in the first scale but not displayed on the electronic map in the second scale; and delete the preset number of spatial points from the first map data to obtain the second map data corresponding to the second scale.

In a possible design, before processing the second map data according to a neighboring relation of map elements to obtain third map data, so as to eliminate a crack between adjacent map elements in the second map data, the processing unit 13 is further configured to: collect the first map data according to the first scale, where the first map data includes a plurality pieces of background surface data, and different background surface data in the plurality pieces of background surface data are configured to display different map elements; and determine a neighboring relation set according to the plurality pieces of background surface data, where the neighboring relation set includes the neighboring relation of map elements.

In a possible design, when determining a neighboring relation set according to the plurality pieces of background surface data, the processing unit 13 is configured to: determine an out surrounding frame corresponding to each of the plurality pieces of background surface data to obtain a plurality of out surrounding frames; determine intersecting out surrounding frames from the plurality of out surrounding frame to obtain a plurality of out surrounding frame groups, where two out surrounding frames contained in each of the plurality of out surrounding frame groups intersect; for each of the plurality of out surrounding frame groups, determine whether map elements corresponding to out surrounding frames in the out surrounding frame group are adjacent; and store a neighboring relation in the neighboring relation set if the map elements corresponding to out surrounding frames in the out surrounding frame group are adjacent.

In a possible design, after processing the second map data according to a neighboring relation of map elements to obtain third map data, so as to eliminate a crack between adjacent map elements in the second map data, the processing unit 13 is further configured to: determine third background surface data from the third map data, where the third background surface data is configured to display a third background surface, and the third background surface is any one of a plurality of background surfaces indicated by the third map data; divide the third background surface into a plurality of triangles, where any two triangles of the plurality of triangles do not intersect; and perform accuracy processing on the third background surface data according to the plurality of triangles.

In a possible design, when performing accuracy processing on the third background surface data according to the plurality of triangles, the processing unit 13 is configured to: determine accuracy information corresponding to the second scale; and perform accuracy processing on the third background surface data according to the accuracy information and the plurality of triangles.

The apparatus for displaying the electronic map according to the embodiment of the present application may be used in the method executed by the server in the above embodiments, its implementation principle and technical effects are similar, and will not be repeated here.

According to the embodiments of the present application, an electronic device and a readable storage medium are further provided.

According to the embodiments of the present application, the present application also provides a computer program product including a computer program, the computer program is stored in a readable storage medium, at least one processor of an electronic device can read the computer program from the readable storage medium, and the at least one processor executes the computer program to enable the electronic device to execute the scheme provided by any one of the above embodiments.

Figure 8:
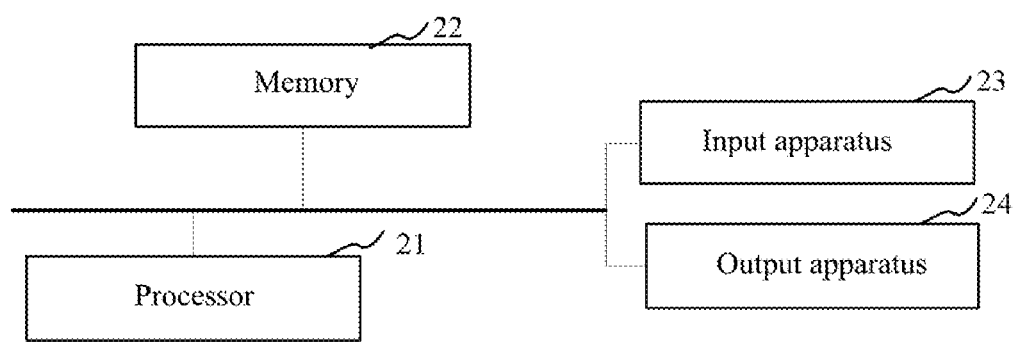
FIG. 8 is a block diagram of an electronic device for implementing a method for displaying an electronic map in embodiments of the present application.

FIG. 8 is a block diagram of an electronic device for implementing a method for displaying an electronic map in embodiments of the present application. Electronic devices are intended to represent various forms of digital computers, such as laptops, desktop computers, workstations, personal digital assistants, servers, blade servers, mainframe computers, and other suitable computers. Electronic devices may also represent various forms of mobile apparatus, such as personal digital assistants, cellular phones, smart phones, wearable apparatus, and other similar computing apparatus. The components shown herein, their connections and relations, and their functions are merely examples, and are not intended to limit the implementation of the present application described and/or required herein.

As shown in FIG. 8, the electronic device includes: one or more processors 21, a memory 22, and interfaces for connecting various components, including high-speed interfaces and low-speed interfaces. The various components are connected using different buses, and may be installed on a common motherboard or installed in other ways as needed. The processor may process instructions executed in the electronic device, including instructions stored on the memory to display graphical information of the graphical user interface (GUI) on external input/output apparatus (such as a display device coupled to an interface). In other embodiments, a plurality of processors and/or a plurality of buses may be used with a plurality of memories, if required. Similarly, a plurality of electronic devices may be connected, and each device provides part of necessary operations (for example, as a server array, a set of blade servers, or a multi-processor system). In FIG. 8, a processor 21 is taken as an example.

The memory 22 is the non-transitory computer-readable storage medium provided by the present application. The memory stores instructions for execution by at least one processor, and the instructions, when executed, cause the at least one processor to perform the method for displaying the electronic map provided by the present application. The non-transitory computer-readable storage medium of the present application stores computer instructions, and the computer instructions are configured to enable the computer to perform the method for displaying the electronic map provided by the present application.

As a non-transitory computer-readable storage medium, the memory 22 may be configured to store non-transitory software programs, non-transitory computer executable programs and modules, such as program instructions/modules (for example, the receiving unit 11, the generating unit 12, the processing unit 13, and the sending unit 14 shown in FIG. 7) corresponding to the method for displaying the electronic map in the embodiments of the present application. The processor 21 performs various functional applications and data processing of the server, that is, implements the method for displaying the electronic map in the above method embodiments, by running the non-transitory software programs, instructions, and modules stored in the memory 22.

The memory 22 may include a program storage area and a data storage area. The program storage area may store an operating system, and an application program required by at least one function; and the data storage area may store data created when an electronic device performs a method for displaying an electronic map. In addition, the memory 22 may include a high-speed random access memory, and it may also include a non-transitory memory, such as at least one disk memory apparatus, a flash memory apparatus, or other non-transitory solid state memory apparatus. In some embodiments, the memory 22 may optionally include memories remotely provided with respect to the processor 21, and these remote memories may be connected to the electronic device via networks. Examples of the above networks include, but are not limited to, Internet, Intranet, LAN, mobile communication networks, and combinations thereof.

The electronic device may further include: input apparatus 23, and output apparatus 24. The processor 21, the memory 22, the input apparatus 23, and the output apparatus 24 may be connected via a bus or connected in other ways. In FIG. 8, the connection via a bus is taken as an example.

The input apparatus 23 may receive input digital or character information, and generate key signal input related to the user settings and function control of the electronic map display electronic device, such as touch screen, keypad, mouse, trackpad, touchpad, pointer lever, one or more mouse buttons, trackball, joystick and other input apparatus. The output apparatus 24 may include a display device, auxiliary lighting apparatus (for example, LED), and tactile feedback apparatus (for example, a vibration motor). The display device may include, but is not limited to, a liquid crystal display (LCD), a light emitting diode (LED) display, and a plasma display. In some embodiments, the display apparatus may be a touch screen.

Various implementations of the systems and techniques described herein may be implemented in digital electronic circuit systems, integrated circuit systems, ASICs (application-specific integrated circuits), computer hardware, firmware, software, and/or combinations thereof. These various implementations may include: being implemented in one or more computer programs, the one or more computer programs may be executed and/or interpreted on a programmable system including at least one programmable processor, the programmable processor may be a dedicated or general-purpose programmable processor, which may receive data and instructions from a storage system, at least one input apparatus, and at least one output apparatus, and transmit data and instructions to the storage system, the at least one input apparatus, and the at least one output apparatus.

These computer programs (also known as programs, software, software applications, or codes) include machine instructions for programmable processors, and these computer programs may be implemented using high-level procedural and/or object-oriented programming language, and/or assembly/machine language. As used herein, the terms "machine-readable medium" and "computer-readable medium" refer to any computer program product, apparatus, and/or devices (for example, disks, optical disks, memories, and programmable logic apparatus (PLD)) configured to provide machine instructions and/or data to programmable processors, including machine-readable media that receive machine instructions as machine-readable signals. The term "machine-readable signal" refers to any signal configured to provide machine instructions and/or data to programmable processors.

In order to provide interaction with the user, the systems and techniques described herein may be implemented on a computer having: display apparatus (for example, CRT (cathode ray tube) or LCD (liquid crystal display) monitor) for displaying information to the user; and keyboard and pointing apparatus (for example, a mouse, or a trackball) through which the user may provide input to the computer.

Other types of apparatus may also be used to provide interaction with the user, for example, the feedback provided to the user may be any form of sensory feedback (for example, visual feedback, auditory feedback, or tactile feedback), and the input from the user may be received in any form (including acoustic input, voice input, and tactile input).

The systems and techniques described herein may be implemented in a computing system including back-end components (for example, as a data server), or a computing system including middleware components (for example, an application server), or a computing system including front-end components (for example, a user computer with a graphical user interface or a web browser through which the user may interact with the implementations of the systems and techniques described herein), or a computing system including any combination of back-end components, middleware components, and front-end components. The components of the system may be connected to each other through digital data communication (for example, a communication network) in any form or medium. Examples of the communication networks include: local area networks (LAN), wide area networks (WAN), and Internet.

The computing system may include a client and a server. The client and the server are generally far away from each other and usually interact through a communication network. The relation between the client and the server is generated by computer programs running on the corresponding computers and having a client-server relation with each other.

An embodiment of the present application also provides a method for displaying an electronic map, the method includes: determining adjacent map elements in an electronic map when the electronic map is downsized from a first scale to a second scale, determining whether corresponding background surfaces of the adjacent map elements have a continuous common side; and correcting the corresponding background surfaces of the adjacent map elements if the corresponding background surfaces of the adjacent map elements have no continuous common side.

The specific implementation principle of this embodiment may be made reference to the description of the above embodiments, and will not be repeated herein.

With the technical solution according to the embodiment of the present application, the purpose of correctly displaying an electronic map when switching between different scales can be realized by automatic topology correction.

It should be understood that the various forms of processes shown above may be used to reorder, add or delete steps. For example, the steps described in the present application may be performed in parallel, in sequence, or in a different order, as long as the expected result of the technical solution disclosed in the present application can be achieved, there is no limitation herein.

The above specific implementing forms do not constitute a limitation to the protection scope of the present application. Those of ordinary skill in the art should understand that various modifications, combinations, sub-combinations, and substitutions can be made according to design requirements and other factors. Any modifications, equivalent replacements and improvements made within the spirit and principles of the present application shall be included in the protection scope of the present application.

What is claimed is:

1. A method for displaying an electronic map, comprising:
receiving a downsizing instruction from an electronic device, wherein the downsizing instruction is configured to request for downsizing an electronic map in a first scale currently displayed by the electronic device to an electronic map in a second scale, and the second scale is smaller than the first scale;
in response to the downsizing instruction, generating second map data corresponding to the second scale using first map data collected by the electronic map under the first scale;
processing the second map data according to a pre-stored neighboring relation of map elements to obtain third map data, so as to eliminate a crack between adjacent map elements in the second map data; and
sending the third map data to the electronic device, so that the electronic device displays the electronic map in the second scale according to the third map data;
wherein the processing the second map data according to the pre-stored neighboring relation of map elements to obtain third map data comprises:
determining first background surface data and second background surface data from the second map data according to the pre-stored neighboring relation of map elements, wherein the first background surface data is configured to display a first background surface, the second background surface data is configured to display a second background surface, the first background surface corresponds to a first map element, the second background surface corresponds to a second map element, and the first map element and the second map element are two adjacent map elements in the electronic map, there is a first common side between a background surface corresponding to the first map element in the electronic map in the first scale and a background surface corresponding to the second map element in the electronic map in the first scale;
determining whether there exists a crack between the first background surface and the second background surface according to the first background surface data, the second background surface data and the first common side; and
processing the first background surface data and the second background surface data to eliminate the crack between the first background surface and the second background surface if there exists the crack between the first background surface and the second background surface.

2. The method according to claim 1, wherein the processing the first background surface data and the second background surface data to eliminate the crack between the first background surface and the second background surface if there exists the crack between the first background surface and the second background surface comprises:
determining a first side on the first background surface and a second side on the second background surface if there exists the crack between the first background surface and the second background surface, wherein there exists a crack between the first side and the second side;
determining a common side for the first side and the second side according to the first side and the second side; and
adjusting the first background surface and the second background surface according to the common side, so that the first background surface and the second background surface adjoin each other.

3. The method according to claim 2, wherein the adjusting the first background surface and the second background surface according to the common side, so that the first background surface and the second background surface adjoin each other comprises:
  expanding the first background surface and the second background surface towards a direction of the common side until that the first background surface and the second background surface share the common side.

4. The method according to claim 1, wherein the in response to the downsizing instruction, generating second map data corresponding to the second scale using first map data collected by the electronic map under the first scale comprises:
  determining a preset number of spatial points from the first map data in response to the downsizing instruction, wherein the spatial points are points displayed on the electronic map in the first scale but not displayed on the electronic map in the second scale; and
  deleting the preset number of spatial points from the first map data to obtain the second map data corresponding to the second scale.

5. The method according to claim 1, wherein before the processing the second map data according to the pre-stored neighboring relation of map elements to obtain third map data, so as to eliminate a crack between adjacent map elements in the second map data, the method further comprises:
  collecting the first map data according to the first scale, wherein the first map data comprises a plurality pieces of background surface data, and different background surface data in the plurality pieces of background surface data are configured to display different map elements; and
  determining a neighboring relation set according to the plurality pieces of background surface data, wherein the neighboring relation set comprises the pre-stored neighboring relation of map elements.

6. The method according to claim 5, wherein the determining the neighboring relation set according to the plurality pieces of background surface data comprises:
  determining an out surrounding frame corresponding to each of the plurality pieces of background surface data to obtain a plurality of out surrounding frames;
  determining intersecting out surrounding frames from the plurality of out surrounding frame to obtain a plurality of out surrounding frame groups, wherein two out surrounding frames contained in each of the plurality of out surrounding frame groups intersect;
  for each of the plurality of out surrounding frame groups, determining whether map elements corresponding to out surrounding frames in the out surrounding frame group are adjacent; and
  storing a neighboring relation in the neighboring relation set if the map elements corresponding to out surrounding frames in the out surrounding frame group are adjacent.

7. The method according to claim 1, wherein after the processing the second map data according to the pre-stored neighboring relation of map elements to obtain third map data, so as to eliminate a crack between adjacent map elements in the second map data, the method further comprises:
  determining third background surface data from the third map data, wherein the third background surface data is configured to display a third background surface, and the third background surface is any one of a plurality of background surfaces indicated by the third map data;
  dividing the third background surface into a plurality of triangles, wherein any two triangles of the plurality of triangles do not intersect; and
  performing accuracy processing on the third background surface data according to the plurality of triangles.

8. The method according to claim 7, wherein the performing accuracy processing on the third background surface data according to the plurality of triangles comprises:
  determining accuracy information corresponding to the second scale; and
  performing accuracy processing on vertices of each of the plurality of triangles; and
  merging the plurality of triangles after accuracy processing to obtain the processed third background surface data.

9. An electronic device, comprising:
  at least one processor; and
  a memory communicatively connected to the at least one processor;
  wherein the memory stores instructions thereon, and the instructions, when executed by the at least one processor, cause the at least one processor to:
  receive a downsizing instruction from an electronic device, wherein the downsizing instruction is configured to request for downsizing an electronic map in a first scale currently displayed by the electronic device to an electronic map in a second scale, and the second scale is smaller than the first scale;
  in response to the downsizing instruction, generate second map data corresponding to the second scale using first map data collected by the electronic map under the first scale;
  process the second map data according to a pre-stored neighboring relation of map elements to obtain third map data, so as to eliminate a crack between adjacent map elements in the second map data; and
  send the third map data to the electronic device, so that the electronic device displays the electronic map in the second scale according to the third map data;
  wherein the at least one processor is further configured to:
  determine first background surface data and second background surface data from the second map data according to the pre-stored neighboring relation of map elements, wherein the first background surface data is configured to display a first background surface, the second background surface data is configured to display a second background surface, the first background surface corresponds to a first map element, the second background surface corresponds to a second map element, and the first map element and the second map element are two adjacent map elements in the electronic map, there is a first common side between a background surface corresponding to the first map element in the electronic map in the first scale and a background surface corresponding to the second map element in the electronic map in the first scale;
  determine whether there exists a crack between the first background surface and the second background surface according to the first background surface data, the second background surface data and the first common side; and
  process the first background surface data and the second background surface data to eliminate the crack between the first background surface and the second background surface if there exists the crack between the first background surface and the second background surface.

10. The electronic device according to claim 9, wherein if there exists the crack between the first background surface and the second background surface, when processing the first background surface data and the second background surface data to eliminate the crack between the first background surface and the second background surface, the at least one processor is configured to:
- determine a first side on the first background surface and a second side on the second background surface, wherein there exists a crack between the first side and the second side;
- determine a common side for the first side and the second side according to the first side and the second side; and
- adjust the first background surface and the second background surface according to the common side, so that the first background surface and the second background surface adjoin each other.

11. The electronic device according to claim 9, wherein the at least one processor is further configured to:
- determine a preset number of spatial points from the first map data in response to the downsizing instruction, wherein the spatial points are points displayed on the electronic map in the first scale but not displayed on the electronic map in the second scale; and
- delete the preset number of spatial points from the first map data to obtain the second map data corresponding to the second scale.

12. The electronic device according to claim 9, wherein before processing the second map data according to the pre-stored neighboring relation of map elements to obtain third map data, so as to eliminate a crack between adjacent map elements in the second map data, the at least one processor is further configured to:
- collect the first map data according to the first scale, wherein the first map data comprises a plurality pieces of background surface data, and different background surface data in the plurality pieces of background surface data are configured to display different map elements; and
- determine a neighboring relation set according to the plurality pieces of background surface data, wherein the neighboring relation set comprises the pre-stored neighboring relation of map elements.

13. The electronic device according to claim 12, wherein when determining the neighboring relation set according to the plurality pieces of background surface data, the at least one processor is further configured to:
- determine an out surrounding frame corresponding to each of the plurality pieces of background surface data to obtain a plurality of out surrounding frames;
- determine intersecting out surrounding frames from the plurality of out surrounding frame to obtain a plurality of out surrounding frame groups, wherein two out surrounding frames contained in each of the plurality of out surrounding frame groups intersect;
- for each of the plurality of out surrounding frame groups, determine whether map elements corresponding to out surrounding frames in the out surrounding frame group are adjacent; and
- store a neighboring relation in the neighboring relation set if the map elements corresponding to out surrounding frames in the out surrounding frame group are adjacent.

14. The electronic device according to claim 9, wherein after processing the second map data according to the pre-stored neighboring relation of map elements to obtain third map data, so as to eliminate a crack between adjacent map elements in the second map data, the at least one processor is further configured to:
- determine third background surface data from the third map data, wherein the third background surface data is configured to display a third background surface, and the third background surface is any one of a plurality of background surfaces indicated by the third map data;
- divide the third background surface into a plurality of triangles, wherein any two triangles of the plurality of triangles do not intersect; and
- perform accuracy processing on the third background surface data according to the plurality of triangles.

15. The electronic device according to claim 14, wherein when performing accuracy processing on the third background surface data according to the plurality of triangles, the at least one processor is configured to:
- determine accuracy information corresponding to the second scale; and
- perform accuracy processing on vertices of each of the plurality of triangles; and
- merging the plurality of triangles after accuracy processing to obtain the processed third background surface data.

16. A non-transitory computer-readable storage medium having computer instructions stored thereon, wherein the computer instructions, when executed, cause a computer to perform the method according to claim 1.

* * * * *